US012807149B2

(12) United States Patent
Shahriari et al.

(10) Patent No.: US 12,807,149 B2
(45) Date of Patent: Nov. 24, 2026

(54) HOST VEHICLE WITH DECOUPLED BLEND PATH AND CURVATURE TRACKING CONTROL

(71) Applicant: GM GLOBAL TECHNOLOGY OPERATIONS LLC, Detroit, MI (US)

(72) Inventors: Mohammadali Shahriari, Markham (CA); Ashraf Abualfellat, Grand Blanc, MI (US); Mohammed Raju Hossain, Markham (CA); Reza Zarringhalam, Whitby (CA); Mehdi Abroshan, Whitby (CA); Amirreza Mirbeygi Moghaddam, North York (CA)

(73) Assignee: GM Global Technology Operations LLC, Detroit, MI (US)

(*) Notice: Subject to any disclaimer, the term of this patent is extended or adjusted under 35 U.S.C. 154(b) by 17 days.

(21) Appl. No.: 19/068,445

(22) Filed: Mar. 3, 2025

(65) Prior Publication Data

US 2026/0257676 A1 Sep. 3, 2026

(51) Int. Cl.
*B60W 30/12* (2020.01)
*B60W 10/20* (2006.01)
(Continued)

(52) U.S. Cl.
CPC ............ *B60W 30/12* (2013.01); *B60W 10/20* (2013.01); *B60W 50/00* (2013.01); *G06V 20/588* (2022.01);
(Continued)

(58) Field of Classification Search
CPC ...... B60W 30/12; B60W 10/20; B60W 50/00; B60W 2050/0012; B60W 2050/0022;
(Continued)

(56) References Cited

U.S. PATENT DOCUMENTS 6,385,515 B1 * 5/2002 Dickson ............... G06V 20/588 701/28
9,550,526 B2 * 1/2017 You ...................... B62D 15/025
(Continued)

FOREIGN PATENT DOCUMENTS

DE 102022132422 A1 6/2023

OTHER PUBLICATIONS

Lu, Jimmy Z. Y.; Abualfellat, Ashraf; Zarringhalam, Reza: Achieving automated vehicle path following with blend path curvature control. In: 2022 American control conference (ACC), Jun. 8-10, 2022, Altlanta, GA, USA. Piscataway, NJ : IEEE, 2022.

*Primary Examiner* — Sizo B Vilakazi
(74) *Attorney, Agent, or Firm* — Quinn IP Law

(57) ABSTRACT

A method that controls steering of a host vehicle traveling in a lane includes sensing lane curvature information at a calibrated speed-based look ahead interval. The method includes determining a target path on the lane using the lane curvature information via an electronic control unit (ECU), and computing a first feedforward angle command of the host vehicle to follow the lane curvature. A second feedforward angle command is computed to merge with the target path at a blending point along a blend path. The method includes determining a final feedforward angle command as a sum of the first and second feedforward angle commands. Using the final feedforward angle command, a steering command is calculated that is necessary to correct offset of the host vehicle from the target path. Steering of the host vehicle is controlled via the ECU using the steering command.

20 Claims, 3 Drawing Sheets

(51) Int. Cl.
*B60W 50/00* (2006.01)
*G06V 20/56* (2022.01)

(52) U.S. Cl.
CPC ............... *B60W 2050/0012* (2013.01); *B60W 2050/0022* (2013.01); *B60W 2420/403* (2013.01); *B60W 2510/207* (2013.01); *B60W 2552/30* (2020.02); *B60W 2552/53* (2020.02)

(58) Field of Classification Search
CPC ..... B60W 2420/403; B60W 2510/207; B60W 2552/30; B60W 2552/53; G06V 20/588
See application file for complete search history.

(56) References Cited

U.S. PATENT DOCUMENTS

| | | | | |
|---|---|---|---|---|
| 12,594,935 | B2 * | 4/2026 | Shahriari | B60W 30/12 |
| 2008/0091318 | A1 * | 4/2008 | Deng | B62D 6/003 701/41 |
| 2019/0096257 | A1 | 3/2019 | Alcazar | |
| 2020/0307384 | A1 * | 10/2020 | Mendez Pineda | B60L 50/60 |
| 2023/0023426 | A1 * | 1/2023 | Hamaguchi | B62D 15/025 |
| 2023/0202465 | A1 * | 6/2023 | Handa | B60W 10/20 701/41 |
| 2025/0334423 | A1 * | 10/2025 | Morison | G01C 21/3837 |

* cited by examiner

HOST VEHICLE WITH DECOUPLED BLEND PATH AND CURVATURE TRACKING CONTROL

INTRODUCTION

Advanced Driver Assistance Systems (ADAS) are used to assist drivers in the operation of their automotive vehicles. A typical ADAS includes an adaptive cruise control (ACC) system operable for maintaining a desired vehicle ground speed and following distance, obstacle detection sensors to alert drivers to the presence of vehicles and other objects, and automatic braking systems to slow or stop the vehicle as needed. ADAS capabilities may also include cross traffic alerts, blind spot monitoring, automated parking assistance, and lane keeping assistance (LKA). The latter system monitors the host vehicle's trajectory relative to lane boundaries with the goal of preventing unintentional lane departures.

In a typical LKA system, a vehicle-mounted camera, possibly augmented by lidar, radar, or other vehicle sensors, collects real-time image data of the driving lane ahead of the vehicle. Computer vision software and associated hardware components aboard the host vehicle are used to process the collected image frames to detect painted or natural lane markings and boundaries, i.e., a demarcated lane centerline and the lane's left/right boundaries. Based on these calculations, the LKA system may selectively intervene with vehicle steering inputs by applying a corrective torque overlay via an electronic power steering (EPS) system. The LKA system thus augments or replaces the driver's manual steering inputs to maintain a desired lane position of the vehicle. Feedback loops help ensure that the host vehicle responds appropriately to disturbances along with changes in vehicle speed, yaw rate, acceleration, position, and heading.

SUMMARY

Disclosed herein are automated vehicle control systems and related methodologies for precisely controlling a vehicle's trajectory while a lane keeping assistance (LKA) system autonomously negotiates curves in a travel path. Example paths include a multi-lane clover leaf interchange and other lane curvatures having a relatively small/tight turn radius relative to typical bends, curves, and on/off ramps.

Autonomous lane tracking functionality of an LKA system typically relies on a model-based feedforward control framework on a blend path. As used herein and in the art, "blend path" refers to a calculated vehicle trajectory that, when commanded by an onboard control processor, smoothly merges the vehicle from its current trajectory/path into a centerline of the lane. Calculation of the blend path trajectory is used to determine how aggressively (or how gently) the LKA system will ultimately intervene in the steering maneuver. During tight turning maneuvers, such as when negotiating the above-noted clover leaf interchange, the use of model-based feedforward control becomes challenging due to the blend path's feedback and target path curvature terms being treated in the same harmony, i.e., as a coupled model. As a result, tracking precision accuracy tends to suffer when negotiating clover leaf interchanges and other tight/small radius turns. The present solutions are directed toward addressing this problem and other potential challenges associated with automated steering and lane keeping control when executed on lanes having such tight lane curvature.

The present solutions use a decoupled model adjustment strategy to negotiate different components of a desired blend path. The present strategy employs an explicit feed forward control strategy to maximize the benefit of path shaping while guaranteeing lane trajectory following. Tracking error uncertainty is minimized through the explicit model-based strategy as set forth herein.

In particular, a method for controlling steering of a host vehicle when traveling in a lane includes sensing lane curvature information of the lane at a calibrated speed-based look ahead interval and determining a target path on the lane using the lane curvature information via an electronic control unit (ECU) of the host vehicle. The method also includes computing a first feedforward angle command of the host vehicle to follow the lane curvature, computing a second feedforward angle command of the host vehicle to merge with the target path at a blending point along a blend path, and determining a final feedforward angle command as a sum of the first feedforward angle command and the second feedforward angle command. The method may also include calculating, using the final feedforward angle command, a steering command necessary to correct offset of the host vehicle from the target path, the steering command representing error between curvature of the blend path and curvature of the target path curvature. Steering of the host vehicle is thereafter controlled via the ECU using the steering command.

Sensing the lane curvature information may include receiving, via the ECU, real-time image data from one or more of the sensors mounted to the host vehicle, detecting the lane boundaries of the lane using the real-time image data, and locating the target path between the lane boundaries.

Computing the first feedforward angle command may include using a first formula having a first gain value, and computing the second feedforward angle command includes using a second formula having a second gain value. The first gain value and the second gain value are independently adjustable by the ECU.

The first formula in a representative embodiment includes:

$$\delta_{FF,\rho} = \rho_b(L + K_{us}v^2)\cdot g_1$$

where $\rho_b$ is a blend path curvature of the blend path, L is a wheelbase of the host vehicle, $K_{us}$ is an understeering coefficient, v is a velocity of the host vehicle, and $g_1$ is the first tunable gain value. The second formula may include:

$$\delta_{FF,\rho 2} = \left(-2\rho_v + 2\left(\frac{10y_g}{l^2} - \frac{4\varphi_g}{l}\right)\right)(L + K_{us}v^2)\cdot g_2$$

where $\rho_v$ is a curvature of the vehicle, L is a wheelbase of the host vehicle, $K_{us}$ is an understeering coefficient, v is a velocity of the host vehicle, $g_2$ is the second gain value, $\varphi_g$ is the current heading of the host vehicle, and $y_g$ is a lateral position of the target path at the blending point.

Computing the second feedforward angle command of the host vehicle may include constructing a blend path polynomial, e.g., a $5^{th}$ order polynomial.

Also disclosed herein is an electronic control unit (ECU) for a host vehicle. The ECU includes a processor a non-transitory, computer-readable storage medium ("memory")

storing instructions. The instructions are executable by the processor to cause the processor to sense lane curvature information of the lane at a calibrated speed-based look ahead interval and determine a target path on the lane using the lane curvature information. Instruction execution also causes the processor to compute a first feedforward angle command of the host vehicle to follow the lane curvature, and to compute a second feedforward angle command of the host vehicle to merge with the target path at a blending point along a blend path. The processor is also caused to determine a final feedforward angle command as a sum of the first feedforward angle command and the second feedforward angle command, as well as to calculate, using the final feedforward angle command, a steering command necessary to correct offset of the host vehicle from the target path. The steering command represents error between curvature of the blend path and curvature of the target path curvature. The processor is also caused to control a steering operation of the host vehicle via the ECU using the steering command.

The above features and advantages, and other features and advantages, of the present teachings are readily apparent from the following detailed description of some of the best modes and other embodiments for carrying out the present teachings, as defined in the appended claims, when taken in connection with the accompanying drawings.

Figure 1A:
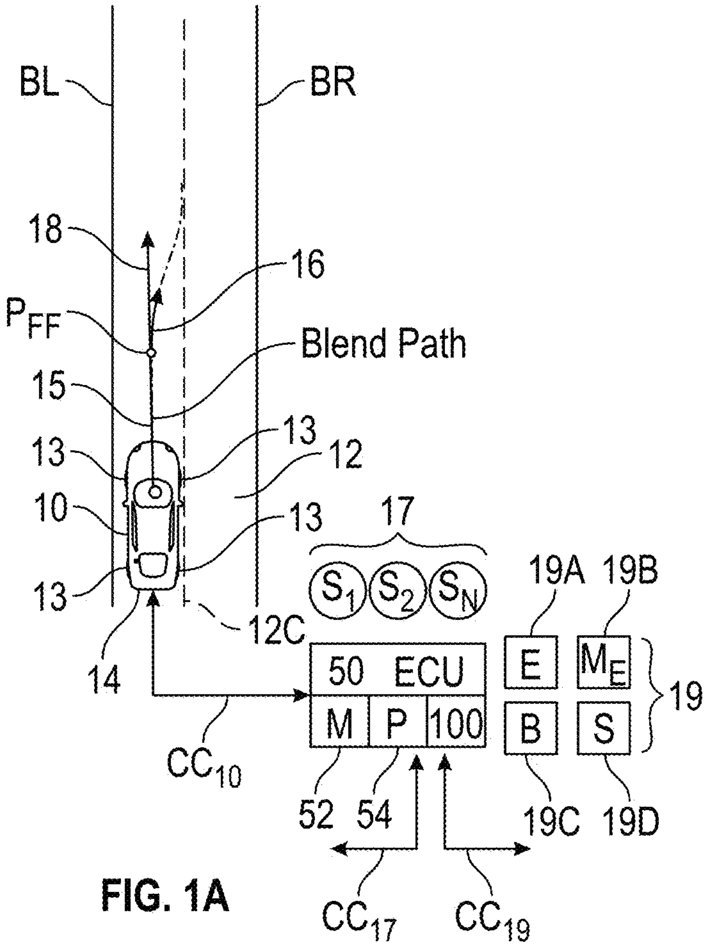
FIG. 1A illustrates a representative host vehicle performing a lane keeping assist (LKA) maneuver along a baseline lane segment.

The present disclosure may be modified or embodied in alternative forms, with representative embodiments shown in the drawings and described in detail below. Inventive aspects of the present disclosure are not limited to the disclosed embodiments. Rather, the present disclosure is intended to cover alternatives falling within the scope of the disclosure as defined by the appended claims.

DETAILED DESCRIPTION

Referring to the drawings, wherein like reference numerals correspond to like or similar components throughout the several Figures, FIG. 1A illustrates a host vehicle 10 ("host 10") traveling along a lane 12 having left and right boundaries (BL and BR, respectively), with "left" and "right" being a driver's right and left side when seated in a normal forward-facing position in the host 10. An approximate centerline of the lane 12 is referred to hereinafter as a target path 12C. The host 10 is depicted as a representative autonomous or semi-autonomous passenger vehicle having a set of road wheels 13 connected to a vehicle body 14, with the road wheels 13 being in rolling contact with a surface of the lane 12. The present teachings may be used with other wheeled or tracked vehicles, including but not limited to motorcycles, trucks, farm equipment, sport utility vehicles, recreational vehicles, and other mobile platforms in different implementations.

Figure 1B:
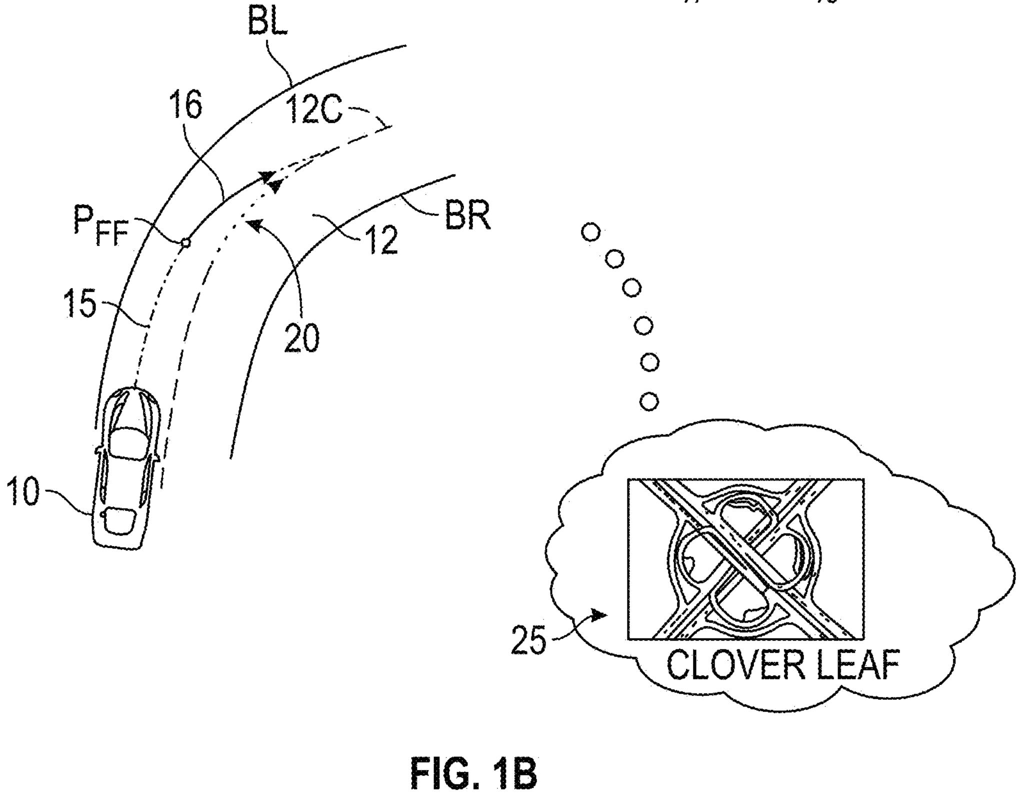
FIG. 1B illustrates the representative host vehicle of FIG. 1A performing an LKA maneuver along a representative curved lane segment, e.g., a clover leaf interchange.

The host 10 of FIG. 1 includes electronic control unit (ECU) 50 configured as an automated driver assist system (ADAS) of a type summarized above. Among other possible programmed functions, the ECU 50 may provide automated driving capabilities to control dynamic driving-related actions or functions with or without the driver's request or intervention. One such function within the scope of the disclosure is that of automated lane keeping assist (LKA) with which the ECU 50 executes the present tracking control method 100 to help the host 10 negotiate normal/baseline curvature or steering adjustments, e.g., as shown in FIG. 1A, as well as smaller radius/tighter lane curvatures (FIG. 1B). A representative embodiment of the method 100 is described below with reference to FIG. 2. By minimizing blend path tracking error across different curvatures, the ECU 50 is able to optimize LKA system performance and minimize driver-perceptible disturbances when negotiating a range of lane curvatures.

The ECU 50 of FIG. 1 is in communication with a sensor suite ("sensors") 17 ($S_1$, $S_2$, . . . , $S_N$) and a set of torque actuators ("actuators") 19, with wired or wireless communication established and maintained with each via a control signals ($CC_{17}$) and ($CC_{19}$), respectively. Depending on the construction of the host 10, the torque actuators 19 may include, e.g., an internal combustion engine (E) 19A, an electric traction motor ($M_E$) 19B, and a brake actuator (B) 19C, each with an associated control processor (not shown). An electronic power steering (EPS) system 19D is also treated herein as a torque actuator for the purposes of the present discussion, with the EPS system 19D responding to commands from the ECU 50 to provide a torque overlay as needed when adjusting the steering angle of the host 10.

The sensors 17 are used to image, scan, examine, and evaluate an area in front of the host 10. For instance, the sensors 17 may include various front field-of-view (FOV) cameras mounted in suitable forward-facing and possible side-facing positions and orientations relative to the vehicle body 14. The sensors 17 may also include forward-looking range sensors for monitoring the surrounding environment, for example radar, lidar, or near-field sensing sensors, cameras and/or video-recognition systems, or other sensing systems capable of performing the described functions.

The sensors 17 may include charged-coupled devices (CCD) or complementary metal oxide semi-conductor (CMOS) video image sensors, and other camera/video image processors which utilize digital photographic methods to view forward objects including one or more proximal vehicle(s). Such sensing systems are employed for detecting and locating objects in automotive applications and are useable with systems including, e.g., adaptive cruise control, autonomous braking, autonomous steering and side-object detection. Additionally, the sensors 17 may include one or more sensors for determining a yaw rate ($\dot{\psi}$) of the host 10 and an angle sensor operable for determining a current steering wheel angle ($\delta$) and a current steering rate ($\dot{\delta}$). These additional values may be used as dynamic inputs to the method 100 when ascertaining the dynamic state of the host 10, along with normally sensed and reported dynamic values such as vehicle speed and heading.

The ECU 50 illustrated in FIG. 1A is depicted schematically as having a computer storage medium/memory (M) 52 and one or more processors (P) 54, the former being inclusive of non-transitory memory or tangible non-transitory storage media/devices (read only, programmable read only, solid-state, random access, optical, magnetic, etc.). The memory 52, on which is recorded computer-readable instructions embodying method 100 (e.g., FIG. 2), is capable of storing machine-readable instructions in the form of one or more software or firmware programs or routines, combinational logic circuit(s), input/output circuit(s) and devices, signal conditioning and buffer circuitry and other components that can be accessed by one or more processors to provide a described functionality.

Additionally with respect to the ECU 50, input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. The ECU 50 executes control routine(s) to provide desired functions. Ultimately, the ECU 50 outputs the sensor control signals $CC_{17}$ to the sensors 17 and the actuator control signals $CC_{19}$ to the torque actuators 19 as needed. Feedback signals may be received in return, as indicated by the double-headed arrows in FIG. 1A. The ECU 50 is therefore configured to control the present dynamic state of the host 10 via a steering command, in particular a commanded steering angle and rate during turning maneuvers negotiated with the assistance of the EPS system 19D as set forth herein.

As shown in FIG. 1A, the host 10 may travel in a forward direction as indicated by forward trajectory 18. A blend path (trace 15) is generated and followed herein to smoothly merge into the target path 12C. A look-ahead/feedforward curvature error input trajectory (trace 16) is also depicted extending from a feedforward control point ($P_{FF}$) toward the target path 12C, with an overarching goal of smoothly merging the host blend path (trace 15)10 with the target path 12C while still accurately following the lane curvature. In contrast, FIG. 1B illustrates representative lane curvature 20 requiring a more aggressive/high curvature steering maneuver in which the host 10 negotiates a tight curve, for instance a cloverleaf exchange 25. The ECU 50 is therefore configured herein to determine the necessary steering inputs needed to close detected or calculated vehicle offset error between curvature of the blend path (trace 15) and road curvature.

Figure 2:
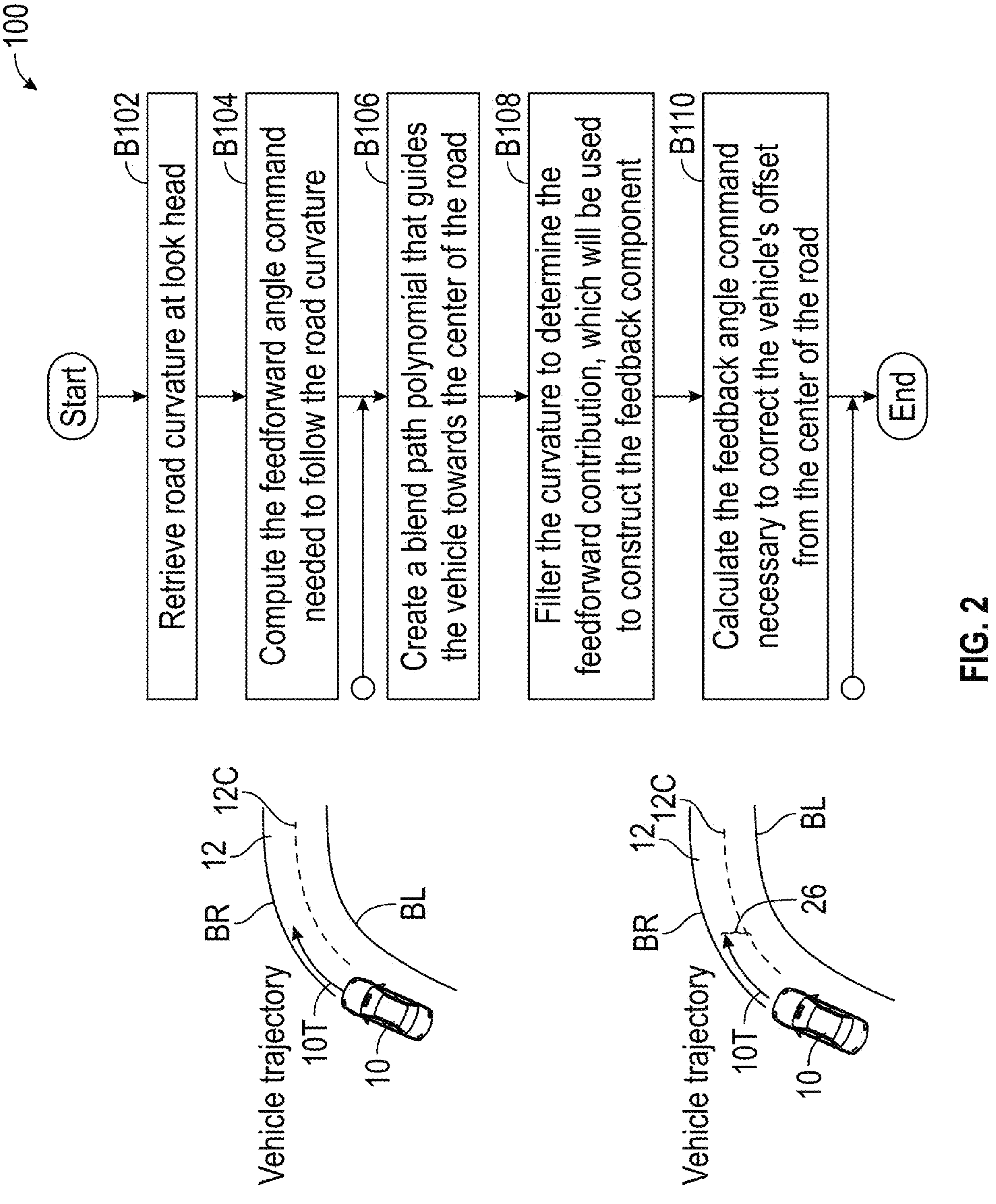
FIG. 2 is a flow chart describing a method for tracking tight curvature during an LKA maneuver of the host vehicle of FIGS. 1A and 1B in accordance with the disclosure.

Referring now to FIG. 2, the method 100 for controlling steering of the host 10 traveling along a trajectory 10T when traveling in the lane 12 may be executed by the processor(s) 54 of the ECU 50 illustrated in FIG. 1A when assisting via a lane keeping assist (LKA) maneuver using the EPS system 19D. The method 100 is described in terms of algorithm code segments or logic blocks for clarity, with each of the blocks being programmed as instructions into the memory 52 of FIG. 1A. Unlike prior approaches that use a coupled model-based framework, i.e., one that couples modeling of curvature of the blend path (trace 15) with curvature of the target path 12C, the present strategy purposefully decouples the two terms and enables use of two separate gain values ($g_1$, $g_2$) as described below. The gain values are thus available to the ECU 50 to optimally tune performance of the LKA maneuver, which may be of particular advantage when negotiating tight turns.

Commencing with block B102, the method 100 includes retrieving road curvature information at a calibrated speed-based "look ahead" interval, for instance 2-3 seconds. Look ahead is intended to allow the sensors 17 to perceive the lane 12 at a predetermined distance ahead of the host 10. Thus, the faster the host 10 is traveling, the farther ahead the sensors 17 and ECU 50 may collect sensor data and determine the lane curvature.

As appreciated by those skilled in the art, block B102 may include sensing lane curvature information of the lane 12 at a calibrated speed-based look ahead interval. This action may entail receiving real-time image data via the ECU 50 from one or more of the sensors 17 (FIG. 1A) mounted to the host 10, detecting the lane boundaries (BL, BR) using the real-time image data, locating the target path 12C between the lane boundaries, and ascertaining the trajectory of lane curvature 20 (FIG. 1B) at a speed-based distance ahead of the host 10, e.g., using higher-order polynomial fitting. The method 100 proceeds to block B104 once the lane curvature has been determined at a predetermined look ahead distance, with such distances represented by the variable x in the discussion appearing below.

Block B104 of FIG. 2 includes determining a target path 12C on the lane 12 using the lane curvature information via the ECU 50. This action may include computing a first component of a feedforward angle command, $\delta_{FF,\rho 1}$, that the host 10 will ultimately require to properly follow the lane curvature 20 from block B102. Such an approach is typically used for controlling LKA maneuvers, with the feedforward angle command determined as follows:

$$\delta_{FF,\rho 1} = \rho_b (L + K_{us} v^2) \cdot g_1 \qquad \text{Equation (1)}$$

where $\rho_b$ is the blend path curvature, L is the wheelbase of the host 10, $K_{us}$ is the understeering coefficient, v is the velocity of the host 10, and $g_1$ is a first tunable gain value. The method 100 proceeds to block B106 once the feedforward angle command ($\delta_{FF,\rho 1}$) has been computed.

At block B106, the ECU 50 of FIG. 1A computes a second feedforward angle command of the host 10 to merge with the target path 12C at a blending point along the blend path. The ECU 50 may create a second component of the feedforward angle command, $\delta_{FF,\rho 2}$, as blend path polynomial that smoothly merges the host 10 with the target path 12C of the lane 12. The feedforward angle command may be determined as follows:

$$\delta_{FF,\rho 2} = \left(-2\rho_v + 2\left(\frac{10y_g}{l^2} - \frac{4\varphi_g}{l}\right)\right)(L + K_{us} v^2) \cdot g_2 \qquad \text{Equation (2)}$$

where $\rho_v$ is the vehicle curvature, i.e., the trajectory the host 10 would take in the absence of dynamic control inputs, $\varphi_g$ is the current heading of the host 10, $y_g$ is the relative target path lateral position at the blending point, and $g_2$ is a second tunable gain value. Equation (1) for controlling lane following is thus decoupled from equation (2) for merging with the target path 12C at the blending point, i.e., where the blend path ultimately meets the target path. As described below, the method 100 also includes determining a final feedforward angle command as a sum of the first feedforward angle command and the second feedforward angle command. Thus, computing the first feedforward angle command includes using a first formula, Equation (1), having the first gain value $g_1$, and computing the second feedforward angle command using a second formula, Equation (2), having the second gain value $g_2$. The first gain value and the second gain value are decoupled and thus independently adjustable by the ECU 50 as part of this approach. The method 100 then proceeds to block B108.

Block B108 of FIG. 2 may include filtering the above curvatures to determine a final feedforward contribution, which will ultimately be used by the ECU 50 to construct a feedback component/steering angle command for steering control of the host 10 in the lane 12 as set forth below. The method 100 proceeds to block B110 once the feedforward contribution has been ascertained.

Block B110 of FIG. 2 includes calculating, using the final feedforward angle command noted above, a steering command necessary to correct offset 26 of the trajectory 10T of the host 10 from the target path 12C. This steering command represents error between curvature of the blend path and curvature of the target path 12C. That is, the feedback angle command is a steering command necessary to correct offset of the host 10 from the target path 12C. This term corresponds to a steering input required of the EPS system 19D (FIG. 1A) to smoothly blend into the target path 12C. The method 100 ultimately includes controlling the steering of the host 10 via the ECU 50 using the steering command. Implementation of some of the above blocks will now be described with reference to analyses (1), (2), and (3).

BLEND PATH ANALYSIS (I): A blend path with a length (l) is designed herein to smoothly blend a trajectory from a current path (vehicle curvature) of the host 10 to a blending point along the target path 12C. Constructing a blend path polynomial, e.g., as part of block B106 of the method 100 illustrated in FIG. 2, may include constructing a $5^{th}$ order polynomial as follows:

$$y_b = b_0 + b_1 x + b_2 x^2 + b_3 x^3 + b_4 x^4 + b_5 x^5$$
$$x \in [0,\ l]$$

where $b_0$, $b_1$, $b_2$, $b_3$, $b_4$, and $b_5$ are blend path coefficient, x is a point at the look ahead distance, and $y_b$ is the blend path lateral position at the blending point.

Three initial conditions for the blend path (trace 15 of FIGS. 1A and 1B) may be set forth as follows:

$$y(0) = 0$$
$$y'(0) = 0$$
$$y''(0) = \rho_v$$
where:
$$y' = \frac{dy}{dx},\ y'' = \frac{d^2y}{dx^2}.$$

End conditions for the blend path at look ahead point x=l, i.e., the blend path length, are therefore expressed as:

$$y(l) = y_g$$
$$y'(l) = \psi_g$$
$$y''(l) = \rho_g$$

This set of equations essentially indicates that the blend path (trace 15) should end at the target path 12C with the heading and curvature of the target path 12C.

Continuing the discussion of Analysis (1), the ECU 50 next may calculate the blend path coefficients $b_0$, $b_1$, and $b_3$ based on initial conditions:

$$b_0 = 0$$
$$b_1 = 0$$
$$b_2 = \frac{\rho_v}{2}.$$

The ECU 50 may thereafter solve the system of equations for the remaining optimal blend path coefficients $b_3$, $b_4$, and $b_5$ as follows:

$$b_2 l^2 + b_3 l^3 + b_4 l^4 + b_5 l^5 = y_g$$
$$2b_2 l + 3b_3 l^2 + 4b_4 l^3 + 5b_5 l^4 = \psi_g$$
$$2b_2 + 6b_3 l + 12b_4 l^2 + 20b_5 l^3 = \rho_g$$

Rearranging the above-three equations results in:

$$b_3 l^3 + b_4 l^4 + b_5 l^5 = y_g - b_2 l^2$$
$$3b_3 l^2 + 4b_4 l^3 + 5b_5 l^4 = \psi_g - 2b_2 l$$
$$6b_3 l + 12b_4 l^2 + 20b_5 l^3 = \rho_g - 2b_2$$

The ECU 50 may solve for this system of equations as follows:

$$\begin{bmatrix} l^3 & l^4 & l^5 \\ 3l^2 & 4l^3 & 5l^4 \\ 6l & 12l^2 & 20l^3 \end{bmatrix} \begin{bmatrix} b_3 \\ b_4 \\ b_5 \end{bmatrix} = \begin{bmatrix} y_g - b_2 l^2 \\ \psi_g - 2b_2 l \\ \rho_g - 2b_2 \end{bmatrix}$$

$$\text{where } A = \begin{bmatrix} l^3 & l^4 & l^5 \\ 3l^2 & 4l^3 & 5l^4 \\ 6l & 12l^2 & 20l^3 \end{bmatrix} \text{ and } B = \begin{bmatrix} y_g - b_2 l^2 \\ \psi_g - 2b_2 l \\ \rho_g - 2b_2 \end{bmatrix}$$

$$\begin{bmatrix} b_3 \\ b_4 \\ b_5 \end{bmatrix} = A^{-1}B = \begin{bmatrix} \frac{10y_g}{l^3} - \frac{4\psi_g}{l^2} + \frac{\rho_g - 3\rho_v}{2l} \\ -\frac{15y_g}{l^4} - \frac{7\psi_g}{l^3} + \frac{2\rho_g - 3\rho_v}{2l^2} \\ +\frac{6y_g}{l^5} - \frac{3\psi_g}{l^4} + \frac{\rho_g - \rho_v}{2l^3} \end{bmatrix}$$

Therefore, the ECU 50 is able to calculate the blend path of FIGS. 1A and 1B using the following blend path equation:

$$y_b = \left(\frac{\rho_v}{2}\right)x^2 + \left(\frac{10y_g}{l^3} - \frac{4\psi_g}{l^2} + \frac{\rho_g - 3\rho_v}{2l}\right)x^3 + \left(-\frac{15y_g}{l^4} + \frac{7\psi_g}{l^3} - \frac{2\rho_g - 3\rho_v}{2l^2}\right)x^4 + \left(\frac{6y_g}{l^5} - \frac{3\psi_g}{l^4} + \frac{\rho_g - \rho_v}{2l^3}\right)x^5$$

where l is the blend path length, x is the look ahead, $y_g$ is the relative target path lateral position at the blending point, $\rho_g$ is the target path curvature at the blending point, $\rho_v$ is the vehicle curvature, and $\psi_g$ is the relative target path heading at the blending point.

ADJUSTED REFERENCE TRAJECTORY (II): Continuing with Analysis (II), the ECU 50 is configured to calculate a desired trajectory state $Y_b$ of the blend path as follows:

$$Y_b = \begin{bmatrix} y_b \\ \dot{y}_b \\ \psi_b \\ \dot{\psi}_b \end{bmatrix} = \begin{bmatrix} y_b \\ \frac{d}{dt} y_b \\ \frac{d}{dx} y_b \\ \frac{d}{dt}\left(\frac{d}{dx} y_b\right) \end{bmatrix}$$

Blend Path as a Function of Error: The ECU 50 next finds the relationship of the blend path and target path error (e). To do this, the ECU 50 may assume an expression of (e) is given by:

$$e = \begin{bmatrix} \frac{\rho_v l^2}{2} - y_g \\ \rho_v v l - v \varphi_g \\ \rho_v l - \varphi_g \\ v(\rho_v - \rho_g) \end{bmatrix}$$

where l is the blend path length, $\rho_v$ is the vehicle curvature, $\rho_g$ is the target path curvature at the blending point, $y_g$ is the relative target path lateral position at the blending point, and $\psi_g$ is the relative target path heading at the blending point. The ECU 50 thus seeks to minimize the error (e) in the course of performing the tight turning maneuver illustrated in FIG. 1B.

The blend path state $Y_b$ stated above may be simplified:

$$Y_b = \Lambda(A_1 e + C_g \rho_g)$$

where $\Lambda$, $A_1$, e, and $C_g$ are defined as follows:

$$\Lambda = \begin{bmatrix} 1 & x & x^2 & x^3 & x^4 & x^5 \\ 0 & v & 2vx & 3vx^2 & 4vx^3 & 5vx^4 \\ 0 & 1 & 2x & 3x^2 & 4x^3 & 5x^4 \\ 0 & 0 & 2v & 6vx & 12vx^2 & 20vx^3 \end{bmatrix}$$

$$A_1 = \begin{bmatrix} 0 & 0 & 0 & 0 \\ 0 & 0 & 0 & 0 \\ 0 & 0 & 0 & \frac{1}{2v} \\ \frac{-10}{l^3} & \frac{2}{l^2 v} & \frac{2}{l^2} & \frac{-1}{2lv} \\ \frac{15}{l^4} & \frac{-3}{l^3 v} & \frac{-4}{l^3} & \frac{1}{l^2 v} \\ \frac{-6}{l^5} & \frac{1}{l^4 v} & \frac{2}{l^4} & \frac{-1}{2l^3 v} \end{bmatrix}$$

$$C_g = \begin{bmatrix} 0 & 0 & \frac{1}{2} & 0 & 0 & 0 \end{bmatrix}^T$$

Note that $A_1$ is a function of the blend path length (l) and velocity (v) of the host 10, and $\Lambda$ is a function of look ahead distance (x) and the velocity (v).

Vehicle State: The vehicle state may next be defined as:

$$Y_v = \begin{bmatrix} \frac{\rho_v x^2}{2} \\ \rho_v x v \\ \rho_v x \\ \rho_v v \end{bmatrix}$$

which in turn can be rewritten for simplicity as:

$$Y_v = \Lambda C_v \rho_v$$

$$\text{where } C_v = \begin{bmatrix} 0 & 0 & \frac{1}{2} & 0 & 0 & 0 \end{bmatrix}^T.$$

Substituting the above into the blend path equation (1) results in the following expressions:

$$y_b = \left(\frac{\rho_v}{2}\right)x^2 + \left(\frac{10y_g}{l^3} - \frac{4\psi_g}{l^2} + \frac{\rho_g - 3\rho_v}{2l}\right)x^3 + \left(-\frac{15y_g}{l^4} + \frac{7\psi_g}{l^3} - \frac{2\rho_g - 3\rho_v}{2l^2}\right)x^4 + \left(\frac{6y_g}{l^5} - \frac{3\psi_g}{l^4} + \frac{\rho_g - \rho_v}{2l^3}\right)x^5$$

$$y_b' = 2\left(\frac{\rho_v}{2}\right)x^1 + 3\left(\frac{10y_g}{l^3} - \frac{4\psi_g}{l^2} + \frac{\rho_g - 3\rho_v}{2l}\right)x^2 + 4\left(-\frac{15y_g}{l^4} + \frac{7\psi_g}{l^3} - \frac{2\rho_g - 3\rho_v}{2l^2}\right)x^3 + 5\left(\frac{6y_g}{l^5} - \frac{3\psi_g}{l^4} + \frac{\rho_g - \rho_v}{2l^3}\right)x^4$$

$$y_b'' = 2\left(\frac{\rho_v}{2}\right) + 6\left(\frac{10y_g}{l^3} - \frac{4\psi_g}{l^2} + \frac{\rho_g - 3\rho_v}{2l}\right)x + 12\left(-\frac{15y_g}{l^4} + \frac{7\psi_g}{l^3} - \frac{2\rho_g - 3\rho_v}{2l^2}\right)x^2 + 20\left(\frac{6y_g}{l^5} - \frac{3\psi_g}{l^4} + \frac{\rho_g - \rho_v}{2l^3}\right)x^3$$

Using an exemplary value of x=⅓, i.e., ⅓ of a total look ahead, which would be 3.$\overline{3}$ for a representative distance of 10 m:

$$\rho_b = 2\left(\frac{\rho_v}{2}\right) + 2\left(\frac{10y_g}{l^2} - \frac{4\psi_g}{l} + \frac{\rho_g - 3\rho_v}{2}\right)$$

$$\rho_b\Big|_{x=\frac{l}{3}} = -2\rho_v + 2\left(\frac{10y_g}{l^2} - \frac{4\psi_g}{l}\right) + \rho_g$$

$$\Delta\rho_b\Big|_{x=\frac{l}{3}} = -2\rho_v + 2\left(\frac{10y_g}{l^2} - \frac{4\psi_g}{l}\right)$$

The feedforward control command $\delta_{FF,P}$ noted above is then calculated by the ECU 50 as a sum of the two feedforward control command components $\delta_{FF,P1}$, $\delta_{FF,P2}$ as follows:

$$\delta_{FF,\rho 1} = \rho_b(L + K_{us}v^2)\cdot g_1$$

$$\delta_{FF,\rho 2} = \left(-2\rho_v + 2\left(\frac{10y_g}{l^2} - \frac{4\psi_g}{l}\right) + \rho_g\right)(L + K_{us}v^2)\cdot g_2$$

$$\delta_{FF,\rho} = \rho_g(L + K_{us}v^2)\cdot g_1 + \left(-2\rho_v + 2\left(\frac{10y_g}{l^2} - \frac{4\psi_g}{l}\right)\right)(L + K_{us}v^2)\cdot g_2$$

Unlike existing approaches, the above expression has two independently adjustable gain values, $g_1$ and $g_2$. Therefore, the ECU 50 may be configured to selectively increase the second gain value $g_2$ without altering the first gain value $g_1$.

Figure 3B:
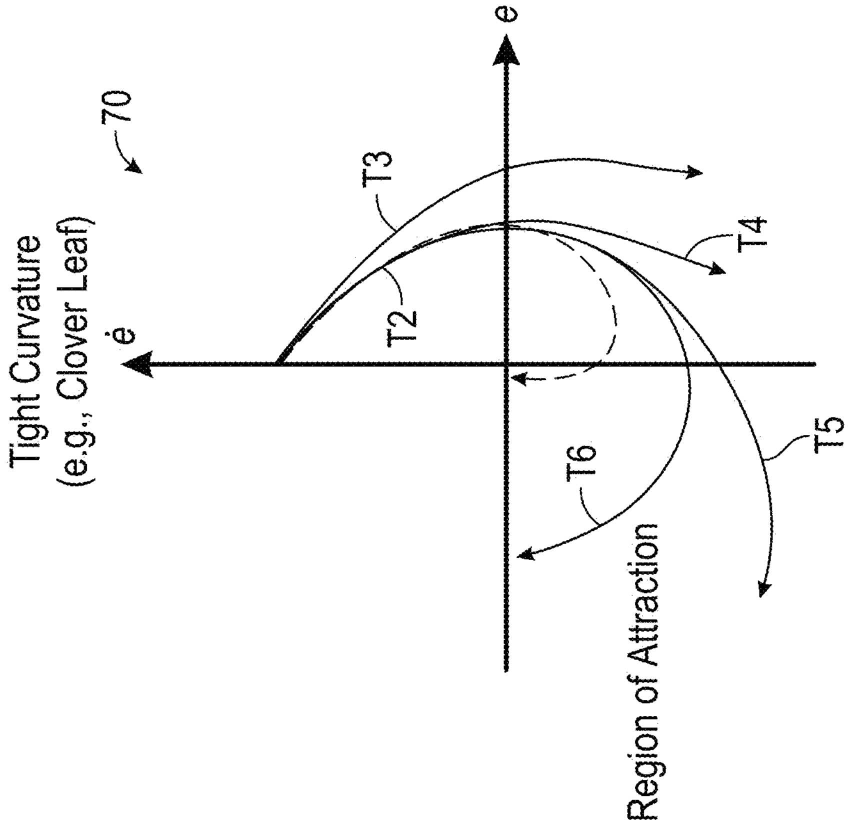
FIGS. 3A and 3B are error plots describing normal/baseline and tight curvature maneuvers of the host vehicle illustrated in FIGS. 1A and 1B, respectively.
Figure 3A:
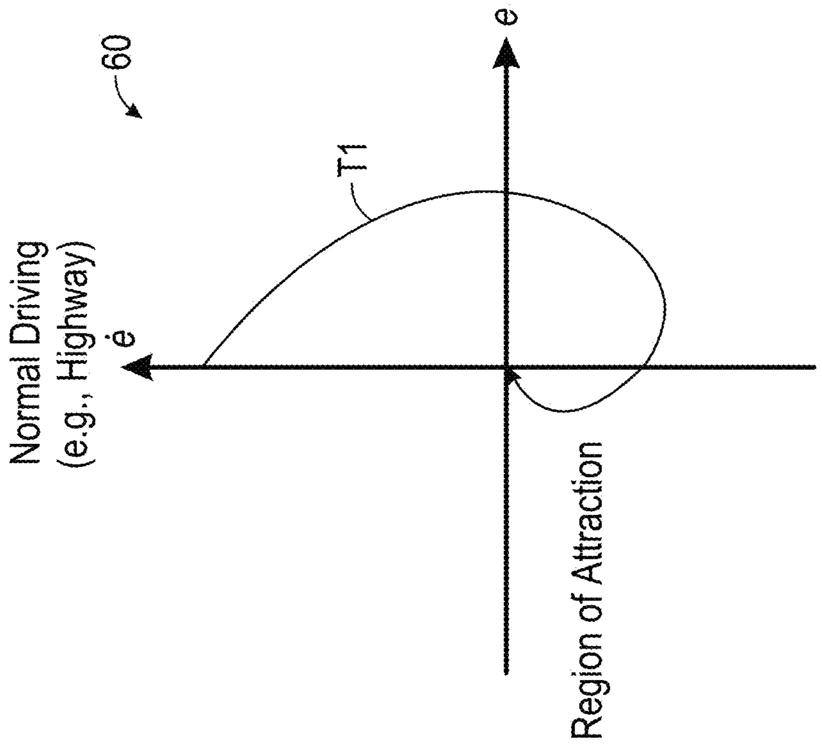

ERROR CALCULATION (III): Analysis (III) pertains to error calculation, with the goal of driving error (e) to zero as shown in FIGS. 3A and 3B. Consider error (e) at the blending point x=1 may be expressed as follows:

$$e = \begin{bmatrix} \frac{\rho_v l^2}{2} - y_g \\ \rho_v v l - v\psi_g \\ \rho_v l - \psi_g \\ v(\rho_v - \rho_g) \end{bmatrix}$$

The blend error path can be calculated by subtracting the blend path from the vehicle path, i.e.,:

$$e_b = Y_v - Y_b$$

Substituting above-described blend and vehicle paths yields:

$$e_b = \Lambda C_v \rho_v - \Lambda(A_1 e + C_g \rho_g)$$

$$e_b = \Lambda(C_v \rho_v - A_1 e - C_g \rho_g)$$

$$e_b = -\Lambda A_1 e + \Lambda(C_v \rho_v - C_g \rho_g)$$

Continuing with the error discussion, the following terms may also be simplified as a function of error:

$$(C_v \rho_v - C_b \rho_g) = -A_2 e$$

where $$A_2 = \begin{bmatrix} 0 & 0 & 0 & 0 \\ 0 & 0 & 0 & -1/(2v) \\ 0 & 0 & 0 & 0 \\ 0 & 0 & 0 & 0 \\ 0 & 0 & 0 & 0 \\ 0 & 0 & 0 & 0 \end{bmatrix}$$

Therefore, the blend path error $e_b$ may be defined directly as a function of the target path error (e), i.e., $e_b = -\Lambda(A_1 + A_2)e$. Blend path errors start at x=0 and end points x=1 are:

$$e_b|_{x=0} = \begin{bmatrix} 0 \\ 0 \\ 0 \\ 0 \end{bmatrix}, \; e_b|_{x=l} = \begin{bmatrix} \frac{\rho_v l^2}{2} - y_g \\ \rho_v v l - v\psi_g \\ \rho_v l - \psi_g \\ v(\rho_v - \rho_g) \end{bmatrix}$$

FIG. 3A illustrates an error plot 60 of a normal/baseline maneuver of the host 10 on the lane 12 of FIG. 1A. Target path error (e) is depicted on the horizontal axis, with its derivative ($\dot{e}$) shown on the vertical axis. In the illustrated region of attraction 65, the feedforward command $\delta_{FF,\rho}$ of trajectory T1 may be determined as:

$$\delta_{FF,\rho} = \rho_b(L + K_{us} v^2) \cdot g$$

Note the single gain value g in this expression and convergence to zero error under normal highway driving, e.g., as shown in FIG. 1A.

In contrast, the error plot 70 of FIG. 3B depicts the tight turning maneuver exemplified in FIG. 1B. Trajectory T2 may be achieved using the present approach of method 100. In this case, the above expression is still used, but it is decoupled to enable gain control of blend path and target path curvature, i.e.:

$$\delta_{FF,\rho} = \rho_g(L + K_{us} v^2) \cdot g_1 + \left(-2\rho_v + 2\left(\frac{10 y_g}{l^2} - \frac{4\psi_g}{l}\right)\right)(L + K_{us} v^2) \cdot g_2$$

This allows the ECU 50 to control merging separately from how the host 10 follows the road curvature. Absent the present teachings, the ECU 50 of FIG. 1A may calculate a number of alternative trajectories T3, T4, T5, or T6 instead of the optimal trajectory T2, with the alternative trajectories never converging on zero error. As a result, the ECU 50 absent the present teachings would exit the LKA maneuver and rely solely on manual steering input from the driver of the host 10.

Implementation of the method 100 and the supporting analysis is intended to make steering control more resistive on tight turns. For example, if a driver moves the host 10 off center, the ECU 50 controls the host 10 so that the host 10 quickly returns to center. Implementation of the method 100 also makes control more robust to noisy input data, such as in the presence of spotty or poor lane detection.

Additionally, due to the decoupled strategy the ECU 50 is able to damp the control using the feedback portion of the blend path while following road curvature using existing strategies. Absent the present teachings and its separate gain handles, such damping would not be possible, possibly resulting in curb exit or perceptible oscillation on curves. In this manner, the disclosure provides a robust curve tracking, feedforward control strategy that minimizes tracking error uncertainty through an explicit model-based control approach. These and other advantages will be readily appreciated by those skilled in the art, now having the benefit of the present disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for controlling a steering operation of a host vehicle when traveling in a lane, the method comprising:
- sensing lane curvature information of the lane at a calibrated speed-based look ahead interval;
- determining a target path on the lane using the lane curvature information via an electronic control unit (ECU) of the host vehicle;
- computing a first feedforward angle command of the host vehicle to follow the lane curvature;
- computing a second feedforward angle command of the host vehicle to merge with the target path at a blending point along a blend path;
- determining a final feedforward angle command as a sum of the first feedforward angle command and the second feedforward angle command;
- calculating, using the final feedforward angle command, a steering command necessary to correct offset of the host vehicle from the target path, the steering command representing error between curvature of the blend path and curvature of the target path; and controlling the steering operation of the host vehicle via the ECU using the steering command.

2. The method of claim 1, wherein sensing the lane curvature information includes receiving, via the ECU, real-time image data from one or more sensors mounted to the host vehicle, detecting lane boundaries of the lane using the real-time image data, and locating the target path between the lane boundaries.

3. The method of claim 1, wherein computing the first feedforward angle command includes using a first formula having a first gain value, and computing the second feedforward angle command includes using a second formula having a second gain value, the first gain value and the second gain value being independently adjustable by the ECU.

4. The method of claim 3, wherein the first formula includes:

$$\delta_{FF,\rho} = \rho_b\left(L + K_{us}v^2\right)\cdot g_1$$

where $\rho_b$ is a blend path curvature of the blend path, L is a wheelbase of the host vehicle, $K_{us}$ is an understeering coefficient, v is a velocity of the host vehicle, and $g_1$ is the first gain value.

5. The method of claim 3, wherein the second formula includes:

$$\delta_{FF,\rho 2} = \left(-2\rho_v + 2\left(\frac{10y_g}{l^2} - \frac{4\varphi_g}{l}\right)\right)\left(L + K_{us}v^2\right)\cdot g_2$$

where $\rho_v$ is a curvature of the vehicle, L is a wheelbase of the host vehicle, $K_{us}$ is an understeering coefficient, v is a velocity of the host vehicle, $g_2$ is the second gain value, $\varphi_g$ is a current heading of the host vehicle, and $y_g$ is a lateral position of the target path at the blending point.

6. The method of claim 1, wherein computing the second feedforward angle command of the host vehicle includes constructing a blend path polynomial.

7. The method of claim 6, wherein constructing the blend path polynomial includes constructing a $5^{th}$ order polynomial.

8. An electronic control unit (ECU) for a host vehicle, comprising:

a processor; and a non-transient, computer-readable storage medium ("memory") storing instructions, wherein the instructions are executable by the processor to cause the processor to:

sense lane curvature information of a lane at a calibrated speed-based look ahead interval;

determine a target path on the lane using the lane curvature information;

compute a first feedforward angle command of the host vehicle to follow the lane curvature;

compute a second feedforward angle command of the host vehicle to merge with the target path at a blending point along a blend path;

determine a final feedforward angle command as a sum of the first feedforward angle command and the second feedforward angle command;

calculate, using the final feedforward angle command, a steering command necessary to correct offset of the host vehicle from the target path, the steering command representing error between curvature of the blend path and curvature of the target path; and control a steering operation of the host vehicle via the ECU using the steering command.

9. The ECU of claim 8, wherein the instructions are executable by the processor to cause the processor to:

sense the lane curvature information by receiving real-time image data from one or more sensors of a sensor suite mounted to the host vehicle;

detect lane boundaries of the lane using the real-time image data; and locate the target path between the lane boundaries.

10. The ECU of claim 8, wherein the instructions are executable by the processor to cause the processor to:

compute the first feedforward angle command using a first formula having a first gain value; and compute the second feedforward angle command using a second formula having a second gain value, the first gain value and the second gain value being independently adjustable by the ECU.

11. The ECU of claim 10, wherein the first formula includes:

$$\delta_{FF,\rho} = \rho_b\left(L + K_{us}v^2\right)\cdot g_1$$

where $\rho_b$ is a blend path curvature of the blend path, L is a wheelbase of the host vehicle, $K_{us}$ is an understeering coefficient, v is a velocity of the host vehicle, and $g_1$ is the first gain value.

12. The ECU of claim 10, wherein the second formula includes:

$$\delta_{FF,\rho 2} = \left(-2\rho_v + 2\left(\frac{10y_g}{l^2} - \frac{4\varphi_g}{l}\right)\right)\left(L + K_{us}v^2\right)\cdot g_2$$

where $\rho_v$ is a curvature of the vehicle, L is a wheelbase of the host vehicle, $K_{us}$ is an understeering coefficient, v is a velocity of the host vehicle, $g_2$ is the second gain value, $\rho_g$ is a current heading of the host vehicle, and $y_g$ is a lateral position of the target path at the blending point.

13. The ECU of claim 10, wherein the instructions are executable by the processor to cause the processor to:

compute the second feedforward angle command by constructing a blend path polynomial.

14. The ECU of claim 13, wherein the instructions are executable by the processor to cause the processor to:

constructing the blend path polynomial as a $5^{th}$ order polynomial.

15. A host vehicle comprising:

a vehicle body;

a set of road wheels connected to the vehicle body;

a sensor suite mounted to the vehicle body;

an electronic power steering (EPS) system connected to at least some of the road wheels, and configured to steer the host vehicle in a lane; and an electronic control unit (ECU) configured to:

sense lane curvature information of the lane at a calibrated speed-based look ahead interval by receiving real-time image data from one or more sensors of the sensor suite, detect lane boundaries of the lane using the real-time image data, and locate a target path on the lane between the lane boundaries using the lane curvature information;

compute a first feedforward angle command of the host vehicle to follow the lane curvature;

compute a second feedforward angle command of the host vehicle to merge with the target path at a blending point along a blend path;

determine a final feedforward angle command as a sum of the first feedforward angle command and the second feedforward angle command;

calculate, using the final feedforward angle command, a steering command necessary to correct offset of the host vehicle from the target path, the steering command representing error between curvature of the blend path and curvature of the target path; and control a steering operation of the host vehicle via the EPS system using the steering command.

16. The host vehicle of claim 15, wherein the ECU is configured to:

compute the first feedforward angle command using a first formula having a first gain value; and compute the second feedforward angle command using a second formula having a second gain value, the first gain value and the second gain value being independently adjustable by the ECU.

17. The host vehicle of claim 16, wherein the first formula includes:

$$\delta_{FF,\rho} = \rho_b\left(L + K_{us}v^2\right)\cdot g_1$$

where $\rho_b$ is a blend path curvature of the blend path, L is a wheelbase of the host vehicle, $K_{us}$ is an understeering coefficient, v is a velocity of the host vehicle, and $g_1$ is the first gain value.

18. The host vehicle of claim 17, wherein the second formula includes:

$$\delta_{FF,\rho 2} = \left(-2\rho_v + 2\left(\frac{10y_g}{l^2} - \frac{4\varphi_g}{l}\right)\right)\left(L + K_{us}v^2\right)\cdot g_2$$

where $\rho_v$ is a curvature of the vehicle, L is a wheelbase of the host vehicle, $K_{us}$ is an understeering coefficient, v is a velocity of the host vehicle, $g_2$ is the second gain value, $\rho_p$ is a current heading of the host vehicle, and $y_g$ is a lateral position of the target path at the blending point.

19. The host vehicle of claim 15, wherein the ECU is configured to compute the second feedforward angle command by constructing a blend path polynomial.

20. The host vehicle of claim 19, wherein the ECU is configured to construct the blend path polynomial as a $5^{th}$ order polynomial.

* * * * *